(12) United States Patent
Takemura (10) Patent No.: US 12,354,480 B2
(45) Date of Patent: Jul. 8, 2025

(54) OBSERVATION DEVICE AND OBSERVATION METHOD

(71) Applicant: KYOCERA Corporation, Kyoto (JP)

(72) Inventor: Shiho Takemura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 84 days.

(21) Appl. No.: 18/261,871

(22) PCT Filed: Jan. 21, 2022

(86) PCT No.: PCT/JP2022/002292
§ 371 (c)(1),
(2) Date: Jul. 18, 2023

(87) PCT Pub. No.: WO2022/163544
PCT Pub. Date: Aug. 4, 2022

(65) Prior Publication Data
US 2024/0078908 A1   Mar. 7, 2024

(30) Foreign Application Priority Data
Jan. 26, 2021   (JP) ................ 2021-010429

(51) Int. Cl.
*G08G 1/16* (2006.01)
*G08G 1/09* (2006.01)
(52) U.S. Cl.
CPC .............. *G08G 1/166* (2013.01); *G08G 1/09* (2013.01)
(58) Field of Classification Search
CPC ............ G08G 1/166; G08G 1/09; G08G 1/16; B60W 40/04; H04N 7/18
See application file for complete search history.

(56) References Cited

U.S. PATENT DOCUMENTS

| 2018/0189600 | A1  | 7/2018 | Astrom et al. |
| 2018/0189699 | A1* | 7/2018 | Lecourt ................. G06Q 50/18 |
| 2020/0225342 | A1* | 7/2020 | Akiyama ............... G01S 13/87 |
| 2021/0335131 | A1* | 10/2021 | Ishikawa ................ G06N 3/04 |

FOREIGN PATENT DOCUMENTS

| JP | 2018-055141 A | 4/2018 |
| JP | 2020-129320 A | 8/2020 |
| KR | 10-1397453 B1 | 5/2014 |
| WO | 2015/001677 A1 | 1/2015 |

* cited by examiner

*Primary Examiner* — Sisay Yacob
(74) *Attorney, Agent, or Firm* — Studebaker Brackett PLLC (57) ABSTRACT

Provided are an observation device and an observation method that can issue an appropriate notification to a vehicle even when recognition results of multiple detection devices are different from each other. An observation device (5) is configured to issue a notification to a vehicle. The observation device (5) includes a first detection device (50-1), a second detection device (50-2), and a controller (53). The first detection device (50-1) is configured to recognize an object present in an observation area. The second detection device (50-2) is configured to recognize the object present in the observation area. The controller (53) is configured to determine a notification recognition result based on a combination of a recognition result for the object produced by the first detection device (50-1) and a recognition result for the object produced by the second detection device (50-2), the notification recognition result being a recognition result for the object to be included in the notification.

7 Claims, 5 Drawing Sheets

OBSERVATION DEVICE AND OBSERVATION METHOD

CROSS-REFERENCE TO RELATED APPLICATIONS

This application claims priority of Japanese Patent Application No. 2021-010429 (filed Jan. 26, 2021), the entire disclosure of which is hereby incorporated by reference.

TECHNICAL FIELD

The present disclosure relates to an observation device and an observation method.

BACKGROUND OF INVENTION

In recent years, development of safe driving support systems has been progressing. In these systems, observation devices are installed at the roadside in order to detect vehicles and pedestrians, and notify approaching vehicles of danger. For example, Patent Literature 1 discloses a technique for recognizing an object captured by a roadside device, which is one type of observation device, and then issuing a notification to the outside. Herein, "object" is used as a term that includes things, people, and animals.

CITATION LIST

Patent Literature

Patent Literature 1: Japanese Unexamined Patent Application Publication No. 2020-129320

SUMMARY

In an embodiment of the present disclosure, an observation device is configured to issue a notification to a mobile object.

The observation device includes a first detection device, a second detection device, and a controller.

The first detection device is configured to recognize an object present in an observation area.

The second detection device is configured to recognize the object present in the observation area.

The controller is configured to determine a notification recognition result based on a combination of a recognition result for the object produced by the first detection device and a recognition result for the object produced by the second detection device, the notification recognition result being a recognition result for the object to be included in the notification.

In an embodiment of the present disclosure, an observation method is provided that is to be performed by an observation device configured to issue a notification to a mobile object.

The observation method includes
  recognizing an object present in an observation area in a first process;
  recognizing the object present in the observation area in a second process; and
  determining a notification recognition result based on a combination of a recognition result for the object produced by the first process and a recognition result for the object produced by the second process, the notification recognition result being a recognition result for the object to be included in the notification.

DESCRIPTION OF EMBODIMENTS (Communication System)

Figure 1:
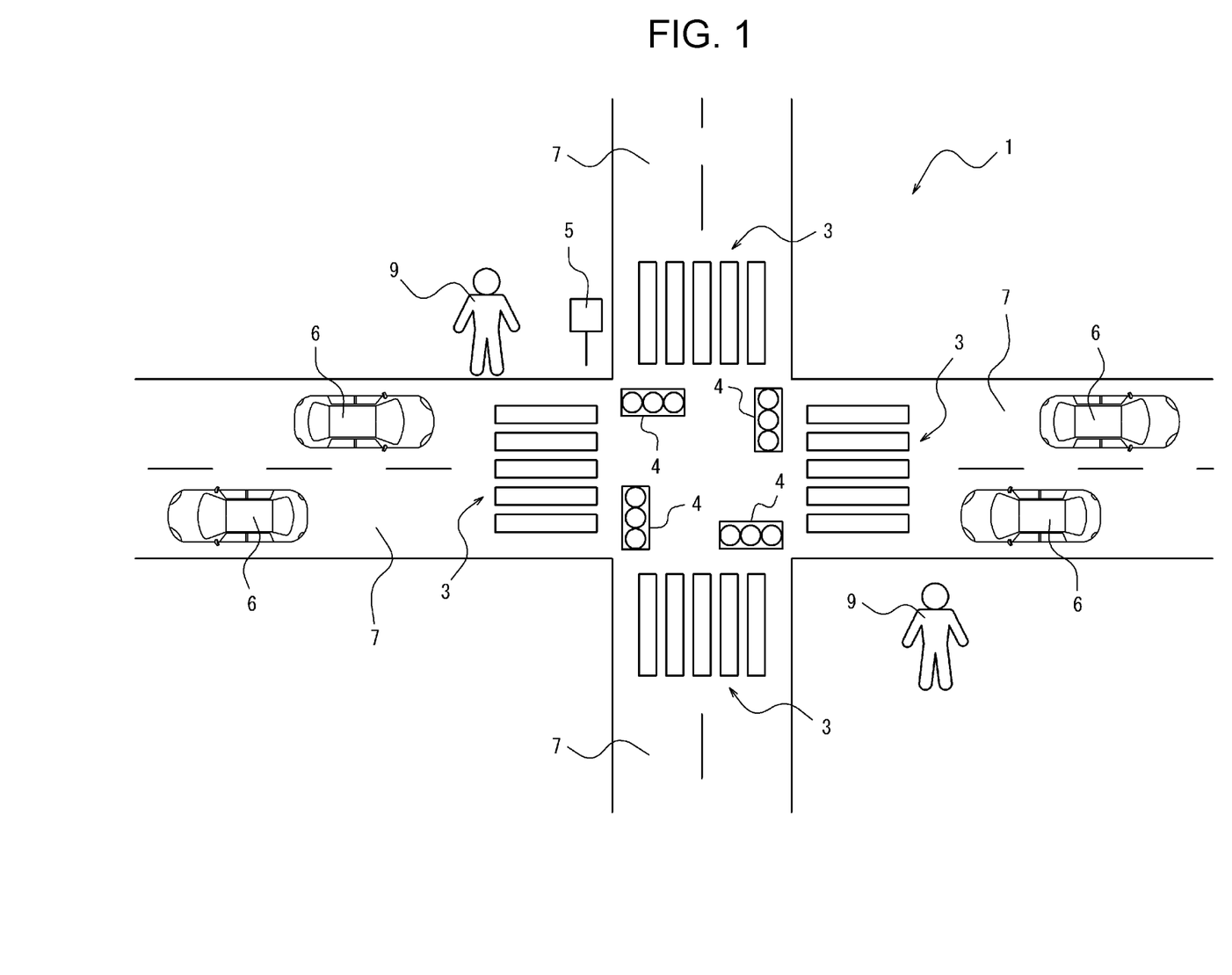
FIG. 1 is a diagram illustrating an example configuration of a communication system that includes an observation device according to an embodiment.

FIG. 1 is a diagram illustrating an example configuration of a communication system 1 that includes an observation device 5 according to an embodiment. The communication system 1 is, for example, a safe driving support communication system for intelligent transport systems (ITS). Safe driving support communication systems are sometimes called safe driving support systems or safe driving support wireless systems.

The observation device 5 is a device that observes objects on a road such as a roadside device or a surveillance camera device. In this embodiment, the observation device 5 is a roadside device and is disposed near an intersection where multiple roads 7 (roadways) intersect. The observation device 5 may be disposed at the side of a road other than at an intersection. The observation device 5 will be described in detail later.

In the communication system 1, the observation device 5 and vehicles 6, such as automobiles, traveling along the roads 7, can communicate wirelessly with each other. Multiple vehicles 6 may be capable of communicating wirelessly with each other. The communication system 1 may be able to further include electronic devices carried by pedestrians 9 and that perform wireless communication. Such electronic devices are, for example, portable terminal devices such as smartphones.

The observation device 5 can notify the drivers of the vehicles 6 of safe driving support information in order to assist the drivers of the vehicles 6 in driving safely. The safe driving support information may include, for example, information on lighting of traffic lights 4, information about road regulations, and road shape information illustrating the shape of the intersection (shape of the roads 7) where the observation device 5 is disposed. The observation device 5 detects nearby vehicles 6 and pedestrians 9. The observation device 5 can detect, for example, a pedestrian 9 crossing a pedestrian crossing 3. The observation device 5 can detect vehicles 6 approaching the intersection. The observation device 5 can include information about the vehicles 6 and the pedestrians 9 detected by the observation device 5 in safe driving support information to be notified to the vehicles 6. The observation device 5 can also include information notified from a vehicle 6 in safe driving support information to be notified to other vehicles 6. As described above, the observation device 5 may also be capable of notifying electronic devices carried by the pedestrians 9 of these pieces of information. In other words, the observation device 5 may issue notifications to mobile objects that include in-vehicle devices and mobile terminal devices.

In this embodiment, the observation device 5 notifies at least the vehicles 6 of the safe driving support information. In this embodiment, notifications include notification recognition results. Notification recognition results are recognition results for objects present in an observation area. As discussed below in detail, a notification recognition result may be a name indicating whether an object has been recognized as a pedestrian 9 or a vehicle 6 of a particular type (for example, a passenger car, a truck, a motorcycle, or a bicycle), and so on. Here, the observation area is the area observed by the observation device 5. The vehicles 6 can receive various information notified from the observation device 5 and other devices by using electronic devices installed therein. An example of an electronic device installed in the vehicles 6 may be a car navigation system. The electronic devices installed in the vehicles 6 can assist the drivers in driving safely by providing warnings and other information to the drivers based on notifications from the observation device 5.

In this way, the communication system 1 assists the drivers of the vehicles 6 in driving safely. Here, the vehicles 6 are not limited to passenger cars, trucks, motorcycles, and bicycles as mentioned above. For example, the vehicles 6 could include buses, trams, and so on.

(Functional Block Diagram of Observation Device)

Figure 2:
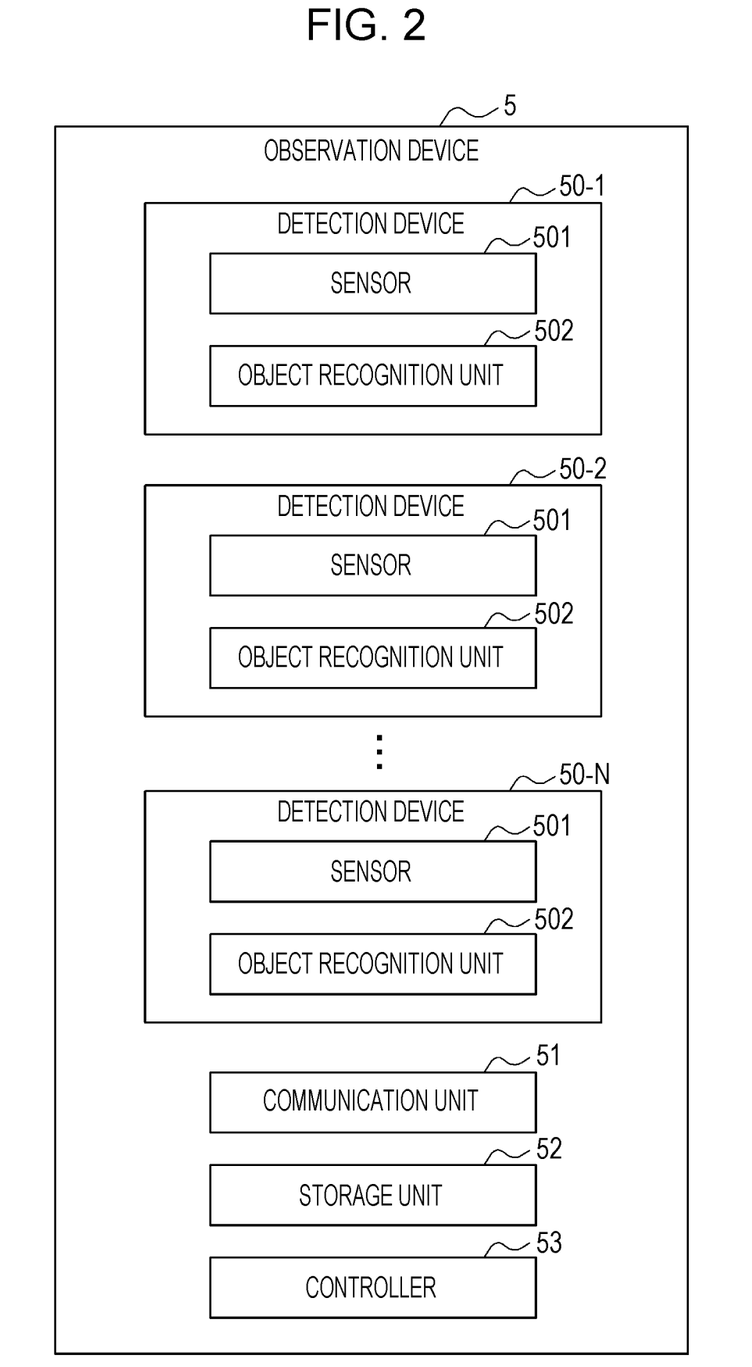
FIG. 2 is an example of a functional block diagram of an observation device according to an embodiment.

FIG. 2 is a functional block diagram of the observation device 5 according to this embodiment. The observation device 5 includes multiple detection devices 50, a communication unit 51, a storage unit 52, and a controller 53. The multiple detection devices 50 include N detection devices 50, where N is an integer greater than or equal to 2, from a first detection device 50-1 to an Nth detection device 50-N. The multiple detection devices 50 include at least the first detection device 50-1 and the second detection device 50-2.

Each detection device 50 is a device that detects objects present in the observation area and recognizes what the objects are based on detection results. The detection device 50 includes a sensor 501 and an object recognition unit 502. At least some of the multiple detection devices 50 may be visible light cameras. The visible light cameras may include, for example, complementary metal oxide semiconductor (CMOS) image sensors capable of performing image capturing in the visible light range as the sensors 501. At least some of the multiple detection devices 50 may be infrared cameras. The multiple detection devices 50 may be devices of the same type or devices of different types. Thermal imaging cameras may include infrared sensors, for example, as the sensors 501. Here, the sensors 501 are not limited to being CMOS image sensors and infrared sensors.

The object recognition unit 502 of each detection device 50 recognizes what objects are present in the observation area based on the detection results of the sensor 501. The object recognition unit 502 may include one or more processors. For example, when the detection device 50 is a visible light camera or an infrared camera, the detection device 50 may extract objects included in a captured image and recognize what the objects are based on features such as the shapes of the objects. The object recognition unit 502 may use any known object recognition method. For example, the object recognition unit 502 may perform object recognition using a pre-trained deep learning model.

Each of the multiple detection devices 50 outputs to the controller 53 recognition results regarding what the objects detected within the observation area are (hereinafter referred to simply as "object recognition results"). At least some of the multiple detection devices 50 output detection signals detected by the sensors 501 to the controller 53. In this embodiment, each of the multiple detection devices 50 outputs object recognition results to the controller 53. As another example, some of the multiple detection devices 50 may output detection signals detected by the sensors 501 to the controller 53 without outputting object recognition results to the controller 53, and the controller 53 may perform object recognition based on the detection signals.

The communication unit 51 is controlled by the controller 53 and wirelessly communicates with the vehicles 6. The communication unit 51 may include a communication circuit and an antenna. The antenna may be an omni-directional antenna, for example. The communication unit 51 may perform wireless communication using the 700 MHz band allocated to ITS, for example. The communication unit 51 may also perform wireless communication using a wireless local area network (LAN), for example.

The communication unit 51 performs various types of processing, such as amplification processing, on signals received by the antenna, and outputs the processed reception signals to the controller 53. The controller 53 performs various types of processing on a reception signal input thereto in order to acquire the information contained in the reception signal. The controller 53 outputs a transmission signal containing information to the communication unit 51. The communication unit 51 performs various types of processing, such as amplification processing, on the transmission signal input thereto and wirelessly transmits the processed transmission signal from the antenna.

In this embodiment, the communication unit 51 is controlled by the controller 53 in order to notify the vehicles 6 of safe driving support information. Notifications include notification recognition results as described below. The notifications may also include an alert level, as described below.

The storage unit 52 may function as a memory for storing various types of information. The storage unit 52 may store programs executed by the controller 53 and the results of processing performed by the controller 53. The storage unit 52 may function as a working memory of the controller 53. The storage unit 52 can be configured using any storage device, including, but not limited to, a semiconductor memory such as ROM and RAM, for example. The storage unit 52 may include, for example, a small hard disk drive or a solid state drive (SSD).

In this embodiment, the storage unit 52 stores a first decision table and a second decision table used by the controller 53 to determine notification recognition results. The storage unit 52 also stores a third decision table used by the controller 53 to determine alert levels. The first, second, and third decision tables are described in detail below.

The controller 53 manages the overall operation of the observation device 5 by controlling the other components of the observation device 5. The controller 53 may include one or more processors. The processor may load programs from an accessible memory in order to realize the various functions of the observation device 5. Such processors may include at least either of general-purpose processors into which specific programs are loaded in order to perform specific functions and dedicated processors dedicated to specific processing. Dedicated processors may include an application specific integrated circuit (ASIC). Processors may include programmable logic devices (PLDs). PLDs may include field-programmable gate arrays (FPGAs). The controller 53 may include at least either of a system-on-a- chip (SoC) and a system in a package (SiP), in which one or more processors work together.

In this embodiment, the controller 53 performs processing for determining notification recognition results. The notification recognition results are object recognition results to be included in notifications. In order to determine the notification recognition results, the controller 53 may calculate the distance to an object and the speed of the object based on detection signals acquired from the sensors 501 and so on.

(Configuration of Observation Device)

Figure 3:
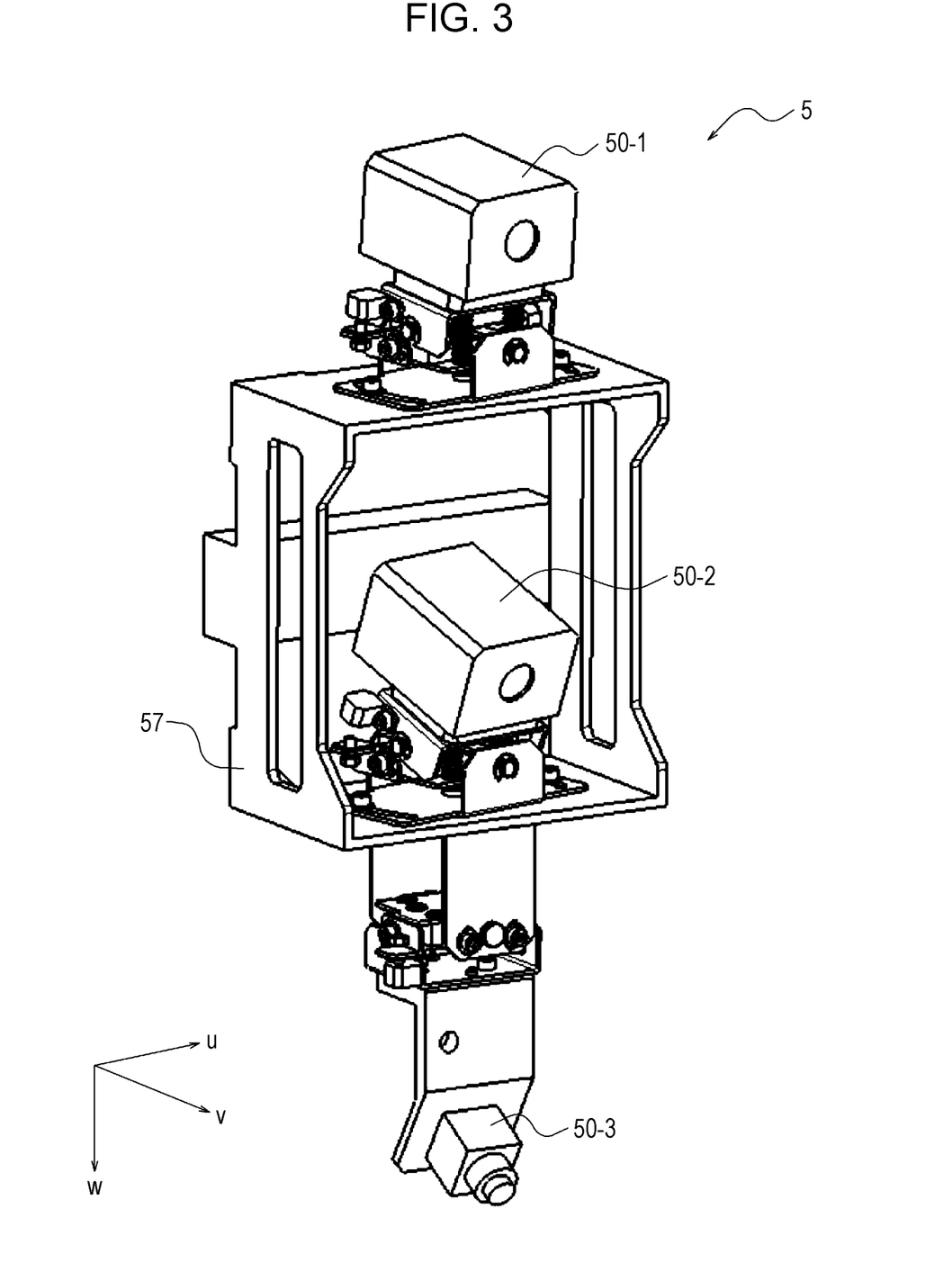
FIG. 3 is a diagram illustrating an example configuration of an observation device according to an embodiment.

FIG. 3 is a diagram illustrating an example configuration of the observation device 5 according to this embodiment. In the example in FIG. 3, the observation device 5 includes a first detection device 50-1, a second detection device 50-2, and a third detection device 50-3. The observation device 5 may be provided as a roadside observation unit. In the observation device 5, the multiple detection devices 50 may be attached to a connection part 57 and the relative positional relationships between the multiple detection devices 50 may be set via the connection part 57.

The connection part 57 is a member configured to allow attachment of multiple detection devices 50. The connection part 57 is for example a metal frame-like member. Here, as illustrated in FIG. 3, Cartesian coordinates can be defined for the observation device 5, which is a roadway observation unit. In this embodiment, a u-axis direction, a v-axis direction, and a w-axis direction correspond to directions in which edges of the connection part 57 extend, the edges intersecting each other at right angles at the corners of the connection part 57. As illustrated in FIG. 3, the multiple detection devices 50 may be disposed in a line in the w-axis direction, but are not restricted to this arrangement. As another example, the multiple detection devices 50 may be disposed in a line in the u-axis direction.

Figure 4:
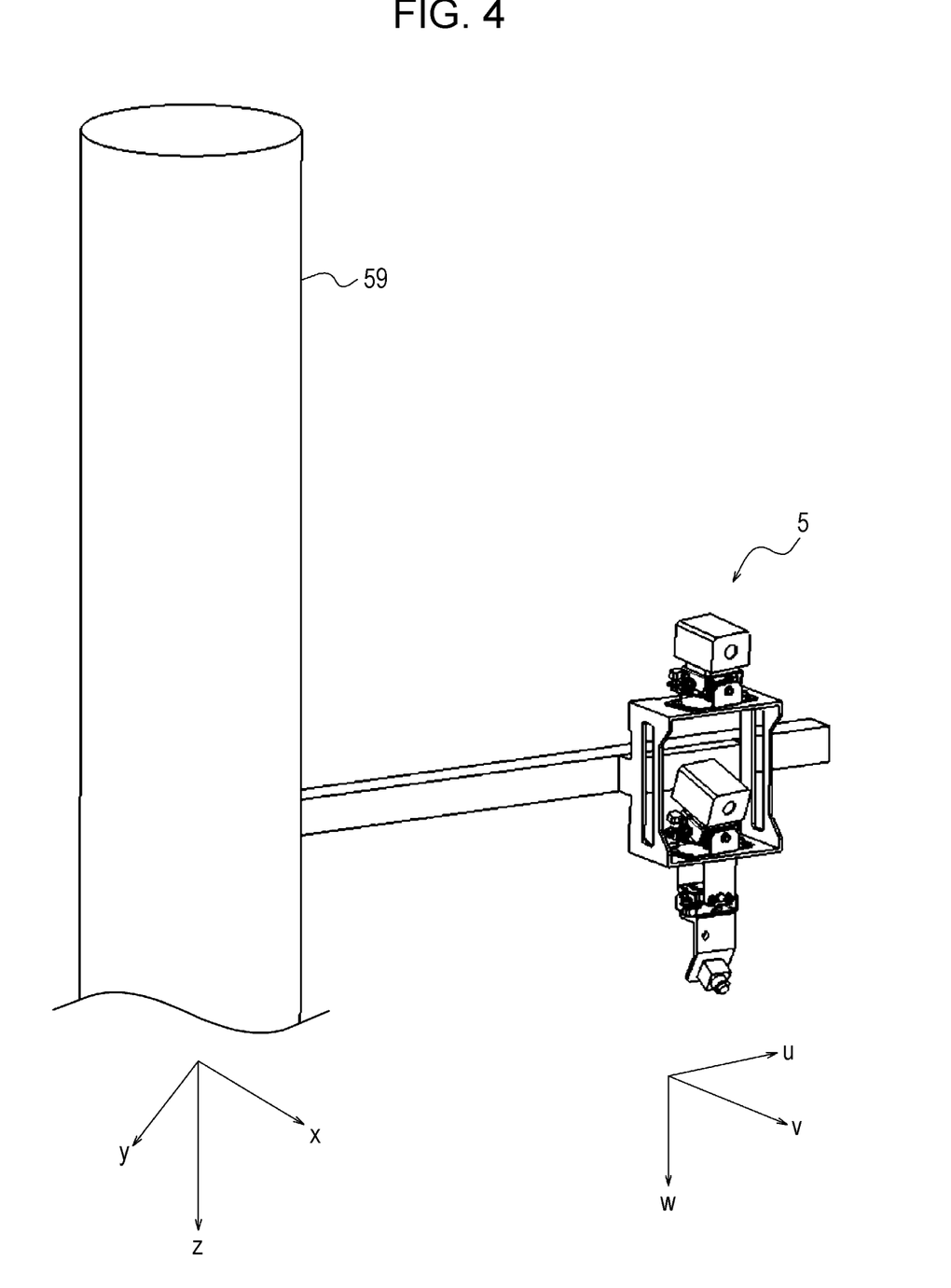
FIG. 4 is a diagram illustrating an example of installation of an observation device according to an embodiment.

FIG. 4 illustrates an example of installation of the observation device 5. The observation device 5 is installed on a pillar 59 near the intersection where the roads 7 intersect that are to be observed, for example. The connection part 57 may be fixed to the pillar 59 and the orientations of the detection devices 50 relative to the connection part 57 may be adjusted. Here, when the observation device 5 is installed in order to observe roads, the w-axis direction is the vertical direction. In FIG. 4, the z-axis direction is a vertical direction, and the x-axis and the y-axis are horizontal directions perpendicular to the z-axis.

(Determination of Notification Recognition Results)

As described above, the controller 53 of the observation device 5 performs processing for determining notification recognition results, which are object recognition results to be included in notifications to the vehicles 6. For example, if a bicycle is approaching the front of a vehicle 6, the driver's attention can be brought to the bicycle in front of the vehicle 6 by including the bicycle as a notification recognition result in a notification to the vehicle 6. For example, if a pedestrian is approaching the front of a vehicle 6, the driver's attention can be brought to the pedestrian in front of the vehicle 6 by including the pedestrian as a notification recognition result in a notification to the vehicle 6. The observation device 5 may include multiple detection devices 50, as in this embodiment, in order to detect the objects present in the observation area without missing any of the objects. The multiple detection devices 50 each share part or all of the observation area. Each of the multiple 50 detection devices recognizes objects present in the observation area. When multiple detection devices 50 have different recognition results for a single object, the driver of the vehicle 6 may be confused if the observation device 5 informs the driver of the multiple different recognition results as they are. For example, one detection device 50 may recognize an object approaching the front of the vehicle 6 as a bicycle and another detection device 50 may recognize the object as a pedestrian. In such a case, if the driver of the vehicle 6 is notified of both recognition results, he or she may be confused and unable to decide whether to pay attention to the bicycle or the pedestrian. Here, whether or not the object detected by each of the detection devices 50 is the same object may be determined by the position of that object and the distance from or the positional relationship with the observation device 5. Therefore, the controller 53 of the observation device 5 in this embodiment determines a notification recognition result using a method described below in order to provide an appropriate notification that enables the driver to correctly pay attention.

Hereafter, an example is described in which a notification recognition result is determined based on a combination of recognition results from two detection devices 50. In the following description, the two detection devices 50 are the first detection device 50-1 and the second detection device 50-2. However, the two detection devices 50 may be any two of the N detection devices 50, from the first detection device 50-1 to the Nth detection device 50-N. The controller 53 may determine a notification recognition result by executing the method described below in multiple stages. For example, the controller 53 determines a first-stage recognition result based on the combination of object recognition results from the first detection device 50-1 and the second detection device 50-2. Then, the controller 53 may determine a second stage recognition result based on the combination of the first stage recognition result and an object recognition result from the third detection device 50-3. The process may be repeated in this manner, and the controller 53 may determine a final-stage recognition result as the notification recognition result. Alternatively, the controller 53 may determine a recognition result as a notification recognition result based on a combination of object recognition results from the first detection device 50-1, the second detection device 50-2, and the third detection device 50-3.

In summary, the observation device 5 first recognizes an object present in the observation area using the first detection device 50-1, and recognizes the same object present in the observation area using the second detection device 50-2. Whether or not the objects are identical may be determined based on the position and speed of the objects. The object detection result produced by the first detection device 50-1 and the object recognition result produced by the second detection device 50-2 may be selected from among the same candidate recognition results. The controller 53 acquires an object detection result produced by the first detection device 50-1 and an object recognition result produced by the second detection device 50-2. The controller 53 then determines a notification recognition result based on a combination of these results. Hereafter, a first recognition result refers to an object recognition result produced by the first detection device 50-1. A second recognition result refers to an object recognition result produced by the second detection device 50-2.

Next, the decision tables and so on used by the controller 53 in determining a notification recognition result will be described. The controller 53 determines a notification recognition result using the first decision table illustrated in Table 1, for example, when the first recognition result and the second recognition result are the same.

TABLE 1

|  | Speed (Fast) | Speed (Slow) | Speed (Stopped) |  |
|---|---|---|---|---|
| (First Detection Device and Second Detection Device) | Passenger Car Truck Motorcycle Bicycle Pedestrian Indefinite | Passenger Car Truck Motorcycle Bicycle — Approaching Object | Passenger Car Truck Motorcycle Bicycle Pedestrian Approaching Object | Passenger Car Truck Motorcycle Bicycle Pedestrian Obstacle |

In the first decision table, the leftmost column illustrates types of objects, which are determination results of the first detection device 50-1 and the second detection device 50-2. The types of objects include passenger car, truck, motorcycle, bicycle, and pedestrian. Here, the first detection device 50-1 and the second detection device 50-2 produce an indefinite result if the detection devices determine that an object does not belong to one of these types. In the first decision table, the other columns illustrate notification recognition results according to the speed of an object. In this embodiment, the speed of movement of an object is classified into three categories. If an object is stopped, the "Speed (Stopped)" column is used. If the speed of the object is slow (less than 50 km/h for example), the "Speed (Slow)" column is used. If the speed of the object is high (50 km/h or higher for example), the "Speed (Fast)" column is used. The controller 53 determines a notification recognition result based on a combination of the type of object indicated by the first recognition result, the type of object indicated by the second recognition result, and the classification of the speed of the object. Here, the controller 53 calculates the speed of an object based on detection signals acquired from the sensors 501 of the first detection device 50-1 and the second detection device 50-2. The controller 53 may calculate the speed of an object based on the difference between the positions (distance traveled) of the object between two captured images captured at a prescribed time interval, for example.

As illustrated in the first decision table, the controller 53 uses the object recognition results of the first detection device 50-1 and the second detection device 50-2 as notification recognition results substantially as they are. However, if the recognition results of the two detection devices 50 are indefinite, the controller 53 uses an approaching object or obstacle as the notification recognition result. This enables the driver's attention to be more correctly directed than if the word "indefinite" were used. In addition, the "Speed (Fast)" column does not include a pedestrian. If the speed of an object recognized as a pedestrian can be recognized as fast, the recognition result may be regarded as "indefinite".

When the first and second recognition results are different, the controller 53 determines the notification recognition result using the second decision table illustrated in Tables 2 to 6 below.

TABLE 2

| (Second Detection Device) | | | | |
|---|---|---|---|---|
| | | Passenger Car | | |
| | | Speed (Fast) | Speed (Slow) | Speed (Stopped) |
| (First Detection Device) | Passenger Car | Passenger Car | Passenger Car | Passenger Car |
| | Truck | Oncoming Vehicle | Oncoming Vehicle | Oncoming Vehicle |
| | Motorcycle | Oncoming Vehicle | Oncoming Vehicle | Oncoming Vehicle |
| | Bicycle | Oncoming Vehicle | Oncoming Vehicle | Oncoming Vehicle |
| | Pedestrian | — | Oncoming Vehicle | Oncoming Vehicle |

TABLE 3

| (Second Detection Device) | | | | |
|---|---|---|---|---|
| | | Truck | | |
| | | Speed (Fast) | Speed (Slow) | Speed (Stopped) |
| (First Detection Device) | Passenger Car | Oncoming Vehicle | Oncoming Vehicle | Oncoming Vehicle |
| | Truck | Truck | Truck | Truck |
| | Motorcycle | Oncoming Vehicle | Oncoming Vehicle | Oncoming Vehicle |
| | Bicycle | Oncoming Vehicle | Oncoming Vehicle | Oncoming Vehicle |
| | Pedestrian | — | Oncoming Vehicle | Oncoming Vehicle |

TABLE 4

| (Second Detection Device) | | | | |
|---|---|---|---|---|
| | | Motorcycle | | |
| | | Speed (Fast) | Speed (Slow) | Speed (Stopped) |
| (First Detection Device) | Passenger Car | Oncoming Vehicle | Oncoming Vehicle | Oncoming Vehicle |
| | Truck | Oncoming Vehicle | Oncoming Vehicle | Oncoming Vehicle |
| | Motorcycle | Motorcycle | Motorcycle | Motorcycle |
| | Bicycle | Oncoming Vehicle | Oncoming Vehicle | Oncoming Vehicle |
| | Pedestrian | — | Oncoming Vehicle | Oncoming Vehicle |

TABLE 5

| (Second Detection Device) | | | | |
|---|---|---|---|---|
| | | Bicycle | | |
| | | Speed (Fast) | Speed (Slow) | Speed (Stopped) |
| (First Detection Device) | Passenger Car | Oncoming Vehicle | Oncoming Vehicle | Oncoming Vehicle |
| | Truck | Oncoming Vehicle | Oncoming Vehicle | Oncoming Vehicle |
| | Motorcycle | Oncoming Vehicle | Oncoming Vehicle | Oncoming Vehicle |

TABLE 5-continued (Second Detection Device)

| | | Bicycle | | |
|---|---|---|---|---|
| | | Speed (Fast) | Speed (Slow) | Speed (Stopped) |
| | Bicycle | Bicycle | Bicycle | Bicycle |
| | Pedestrian | — | Oncoming Vehicle | Stationary Object |

TABLE 6

(Second Detection Device)

| | | Pedestrian | | |
|---|---|---|---|---|
| | | Speed (Fast) | Speed (Slow) | Speed (Stopped) |
| (First Detection Device) | Passenger Car | — | Oncoming Vehicle | Oncoming Vehicle |
| | Truck | — | Oncoming Vehicle | Oncoming Vehicle |
| | Motorcycle | — | Oncoming Vehicle | Oncoming Vehicle |
| | Bicycle | — | Oncoming Vehicle | Stationary Object |
| | Pedestrian | — | Pedestrian | Pedestrian |

In the second decision table, the leftmost column illustrates the type of object, which is a first decision result. The types of objects include passenger car, truck, motorcycle, bicycle, and pedestrian. If either the first recognition result or the second recognition result is indefinite, the controller 53 determines a notification recognition result from the non-indefinite recognition result using the above first decision table. Therefore, the second decision table does not include indefinite cases. The sections "Speed (Stopped)", "Speed (Slow)", and "Speed (Fast)" are the same as in the first decision table.

As illustrated in the second decision table, the controller 53 uses a name that is inclusive or a name that easily captures the driver's attention as the notification recognition result when the first recognition result and the second recognition result are different. For example, if the first recognition result is a passenger car, a truck, a motorcycle, or a bicycle and the second recognition result does not match, the controller 53 will use an oncoming vehicle as the notification recognition result. For example, if the first recognition result is a pedestrian and the second recognition result does not match, the controller 53 will use an oncoming vehicle or a stationary object as the notification recognition result. Thus, when the first and second recognition results are different, the controller 53 also uses a different name from the object type as a notification recognition result. By using a name that encompasses different recognized objects or a name that easily captures the driver's attention, the controller 53 can provide appropriate notifications as safe driving support without confusing the driver. Here, the controller 53 may issue the driver with a notification in which higher importance is placed on safety as a notification recognition result. For example, if the first recognition result is a pedestrian and the second recognition result is a vehicle such as a passenger car or truck, the controller 53 may notify the driver of a pedestrian as the recognition result. In the same case, when notifying a pedestrian of a notification recognition result, the controller 53 may use an oncoming vehicle as the notification recognition result. In other words, the second decision table may have different contents depending on the intended recipients of the notification recognition results.

Here, in the observation device 5 according to this embodiment, the controller 53 determines the notification recognition result using the second decision table when the distance to an object present in the observation area is not small. A small distance is a distance smaller than a prescribed distance. The prescribed distance is 150 m, for example, but is not limited to this distance. For example, the prescribed distance may vary in accordance with the type of recipient of the notification recognition result. Specifically, the prescribed distance may be 70 meters when the recipient of the notification is the smartphone of a pedestrian, and the prescribed distance may be 150 meters when the recipient of the notification is an electronic device installed in a vehicle. The controller 53 may calculate the distance to the object, for example, based on the correspondence between the real distance to the object and the position in the captured image. Such a correspondence may be set at the time of installation of the observation device 5 and stored in the storage unit 52.

When the distance to an object is small, the controller 53 employs the object recognition result having the higher reliability out of the object recognition results of the first detection device 50-1 and the second detection device 50-2 in order to provide a speedy notification. In other words, when the distance to the object is small, the controller 53 does not use the object recognition result having the lower reliability, and instead determines the notification recognition result based on the object recognition result having the higher reliability. Which of the detection devices 50 is more reliable may be fixed in accordance with the type and performance of the detection devices 50. Which of the detection devices 50 is more reliable may also vary according to the circumstances under which the detection devices 50 detect objects. For example, the reliability of the first detection device 50-1 may be set in a fixed manner to be higher than the reliability of the second detection device 50-2. The second detection device 50-2 may be assumed to be more reliable when visibility is poor, such as during fog, nighttime, and so on, while the first detection device 50-1 may be assumed to be more reliable in other weather conditions. For example, if the distance to an object is a small distance and the recognition result of the first detection device 50-1, which has high reliability, is a pedestrian, and the recognition result of the second detection device 50-2 is something other than a pedestrian, the controller 53 will make the notification recognition result be a pedestrian.

The observation device 5 according to this embodiment also determines an alert level based on the distance to the object, the speed of the object, and the notification recognition results determined by the controller 53 based on the first and second decision tables, and includes the alert level in the notification. The alert level is a parameter indicating the degree to which someone ought to pay attention to an object. For example, if the alert level is high, the vehicle 6 needs to take evasive action with respect to the object and slow down and so on, earlier than if the alert level is low. For example, if the alert level is high, the vehicle 6 that receives this information as a notification may draw the driver's attention more strongly, for example, by generating a warning sound.

The controller 53 determines the alert level using the third decision table illustrated in Table 7 below.

TABLE 7

|  |  | Large Distance | | | Small Distance | | |
| --- | --- | --- | --- | --- | --- | --- | --- |
|  |  | Speed (Fast) | Speed (Slow) | Speed (Stopped) | Speed (Fast) | Speed (Slow) | Speed (Stopped) |
| Notification Recognition Result | Passenger Car | Medium | Low | Low | High | Medium | Medium |
|  | Truck | Medium | Low | Low | High | Medium | Medium |
|  | Motorcycle | Medium | Low | Low | High | Medium | Medium |
|  | Oncoming Vehicle | Medium | Low | Low | High | Medium | Medium |
|  | Obstacle | Medium | Low | Medium | High | Medium | High |
|  | Other | Medium | Low | Low | High | Medium | High |

For example, if the notification recognition result is a passenger car, the distance to the object is large (not near) and the speed of the object is slow or stopped, the controller 53 determines the alert level to be low. For example, in the case where the notification recognition result is an obstacle (refer to Table 1), if the distance to the object is small and the speed of the object is stopped, the controller 53 determines the alert level to be high. Here, the obstacle whose speed is a stopped is, for example, a fallen tree. The third decision table illustrated in Table 7 may have content in accordance with the recipients of the notification recognition results. For example, an obstacle whose speed is stopped may have an alert level of medium or higher for the driver of the vehicle, but may have a low alert level when a notification is to be issued to a pedestrian's smartphone.

(Observation Method)

Figure 5:
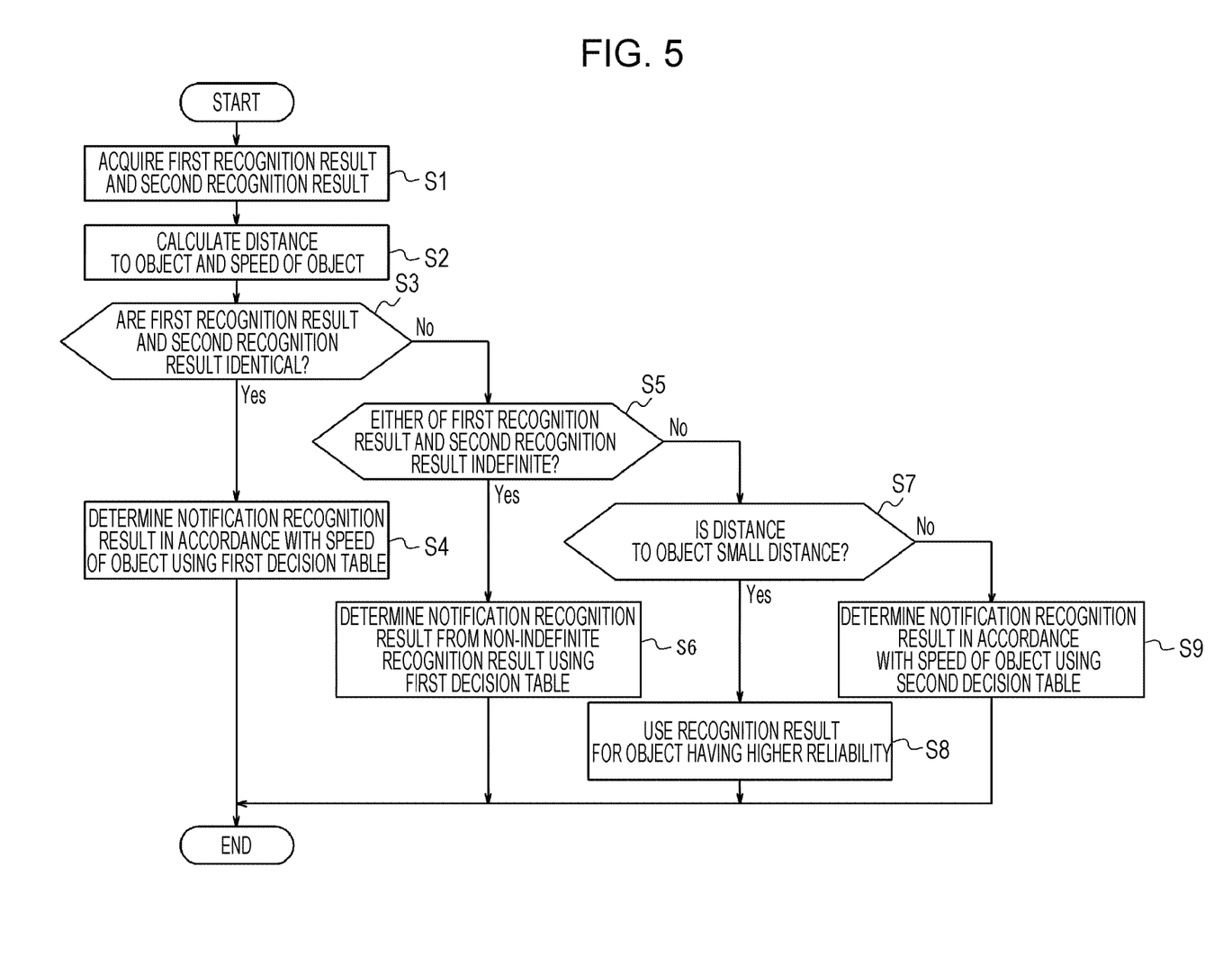
FIG. 5 is a flowchart illustrating an example of an observation method according to an embodiment.

FIG. 5 is a flowchart illustrating an observation method according to an embodiment. The observation device 5 determines a notification recognition result to be included in a notification to be sent to a vehicle 6 in accordance with the flowchart illustrated in FIG. 5.

The controller 53 of the observation device 5 acquires first and second recognition results (Step S1).

The controller 53 of the observation device 5 calculates the distance to an object and the speed of the object (Step S2).

If the first and second recognition results are the same (Yes in Step S3), the controller 53 of the observation device 5 determines a notification recognition result in accordance with the object speed using the first decision table (Step S4).

If the first and second recognition results are different (No in Step S3) and either of the first and second recognition results is indefinite (Yes in Step S5), the controller 53 of the observation device 5 determines the notification recognition result from the non-indefinite recognition result using the first decision table (Step S6).

If neither the first recognition result nor the second recognition result is indefinite (No in Step S5) and the distance to the object is small (Yes in Step S7), the controller 53 of the observation device 5 uses the object recognition result having the higher reliability (Step S8).

When the distance to the object is large (No in Step S7), the controller 53 of the observation device 5 determines the notification recognition result in accordance with the speed of the object using the second decision table (Step S9).

As described above, with the above-described configuration and steps, the observation device 5 and the observation method according to this embodiment are able to provide an appropriate notification to the vehicle 6 as safe driving support by determining a name that encompasses different recognized objects or a name that easily captures the driver's attention as a notification recognition result, even when the recognition results of multiple detection devices 50 differ from each other.

The present disclosure has been described based on the drawings and examples, but note that a variety of variations and amendments may be easily made by one skilled in the art based on the present disclosure. Therefore, note that such variations and amendments are included within the scope of the present disclosure.

For example, the type of objects that are determination results of the first detection device 50-1 and the second detection device 50-2 may include types of animals. Types of animals may be cats, dogs, raccoons, cattle, and deer. In this case, in the first decision table, the notification recognition result may be a small animal when the detection results of the detection devices 50 are a cat, a dog, or a raccoon. In the first decision table, the notification recognition result may be a large animal when determination result of the detection devices 50 is a cow or a deer. In the second decision table, the notification recognition result may be an animal if the detection results of the first detection device 50-1 and the second detection device 50-2 are different types of animals. However, the notification recognition result may be something other than an animal (an oncoming vehicle, a pedestrian, or a stationary object) so as to strongly alert the driver when the determination result of one detection device 50 is a type of animal, but the determination result of the other detection device 50 is a passenger car, a truck, a motorcycle, a bicycle, or a pedestrian.

REFERENCE SIGNS 1 communication system
3 pedestrian crossing
4 traffic light
5 observation device
6 vehicle
7 road
9 pedestrian
50 detection device
50-1 first detection device
50-2 second detection device
50-3 third detection device
51 communication unit
52 storage unit
53 controller
57 connection part
59 pillar
501 sensor
502 object recognition unit

The invention claimed is:

1. An observation device comprising:
a first detection device configured to recognize an object present in an observation area;
a second detection device configured to recognize the object present in the observation area; and
a controller configured to determine a recognition result of the object by the observation device, based on a combination of a type of the object indicated by the recognition result for the object produced by the first detection device, a type of the object indicated by the recognition result for the object produced by the second detection device, and a classification of a speed of the object.

2. The observation device according to claim 1, wherein the controller also uses a name that is different from the recognition result for the object produced by the first detection device or the second detection device as the recognition result of the object by the observation device.

3. The observation device according to claim 1, further comprising a communication unit configured to issue a notification to a mobile object,
wherein the controller includes the recognition result of the object by the observation device as a notification recognition result into the notification.

4. The observation device according to claim 3, wherein a notification recognition result based on a combination of the recognition result for the object produced by the first detection device and the recognition result for the object produced by the second detection device is different depending on a type of mobile object to be notified of the notification recognition result.

5. An observation device comprising:
a first detection device configured to recognize an object present in an observation area;
a second detection device configured to recognize the object present in the observation area; and
a controller configured to determine a recognition result of the object by the observation device, based on a combination of a recognition result for the object produced by the first detection device and a recognition result for the object produced by the second detection device,
wherein the controller determines the recognition result of the object by the observation device, based on the recognition result for the object that is more reliable out of the recognition results produced by the first and second detection devices when a distance to the object is smaller than a prescribed distance.

6. An observation device configured to issue a notification to a mobile object, the observation device comprising:
a first detection device configured to recognize an object present in an observation area;
a second detection device configured to recognize the object present in the observation area; and
a controller configured to determine a notification recognition result based on a combination of a recognition result for the object produced by the first detection device and a recognition result for the object produced by the second detection device, the notification recognition result being a recognition result for the object to be included in the notification,
wherein the controller determines an alert level based on a distance to the object and a speed of the object, and includes the alert level in the notification.

7. An observation device comprising:
a first detection device configured to recognize an object present in an observation area;
a second detection device configured to recognize the object present in the observation area; and
a controller configured to determine a recognition result of the object by the observation device, based on a combination of a recognition result for the object produced by the first detection device and a recognition result for the object produced by the second detection device,
wherein recognition results for the object produced by the first detection device and the second detection device are selected from among identical candidate recognition results.

* * * * *